United States Patent
Witt et al.

[15] 3,694,490
[45] Sept. 26, 1972

[54] PRODUCTION OF PHENOLIC ESTERS OF AROMATIC ACIDS

[72] Inventors: Enrique Roberto Witt; James Patrick Cave, both of Corpus Christi, Tex.

[73] Assignee: Celanese Corporation, New York, N.Y.

[22] Filed: Nov. 18, 1969

[21] Appl. No.: 877,841

[52] U.S. Cl............260/475 PN, 260/473 S, 260/469, 260/470, 260/473 R, 260/474, 260/475 SC, 260/476 R
[51] Int. Cl.................................................C07c 69/82
[58] Field of Search .........260/475 PN, 476 R, 473 R

[56] References Cited

UNITED STATES PATENTS 2,822,378    2/1958    Bader...................260/475 PN
2,833,825    5/1958    Lewis.........................260/476
3,322,772    5/1967    Togashi et al. ......260/475 PN
3,359,302    12/1967    Medley et al........260/475 PN Primary Examiner—Lorraine A. Weinberger
Assistant Examiner—E. Jane Skelly
Attorney—Thomas J. Morgan, Marvin Turken and Kenneth A. Genoni

[57] ABSTRACT

Process for the esterification of aromatic carboxylic acids with monatomic phenols comprising heating in the liquid phase to a temperature above 275°C. a mixture of the aromatic carboxylic acid with the monoatomic phenol. Catalysts are not necessary but acidic catalysts such as phosphoric acid may be utilized if desired. The esters are monomers that can be used to prepare several types of high performance polymers.

10 Claims, No Drawings

3,694,490

PRODUCTION OF PHENOLIC ESTERS OF AROMATIC ACIDS

BACKGROUND OF THE INVENTION

The present invention relates to the production of phenolic esters of aromatic carboxylic acids.

The production of various phenolic esters of aromatic carboxylic acids, such as diphenyl terephthalate and monophenyl terephthalate, have become of significant commercial interest in recent years due to their use in a great many types of processes. For example, diphenyl terephthalate and diphenyl isophthalate dissolved in a solvent may be reacted with a primary diamine to produce polyamides. Likewise, 3,3'-diaminobenzidine may be condensed with various diphenyl esters to form polybenzimidazoles. However despite the importance of these phenolic esters no satisfactory processes have been developed for their production. The classic method of producing them has been by the reaction of acid chlorides with a phenol to produce the phenyl ester and hydrogen chloride as a by-product. While such a process is effective for the production of phenolic esters, it suffers the disadvantage that it utilizes fairly expensive reagents, i.e., the acid chlorides, and also requires expensive equipment due to the corrosive nature of the reactants and by-products.

It is thus an object of the present invention to provide a process for the production of phenolic esters of aromatic carboxylic acids, especially diphenyl esters of phthalic acids. It is also an object of the present invention to provide a simple process for the production of phenolic esters of aromatic acids which process may utilize relatively inexpensive reactants and equipment. Other objects of the present invention will become apparent from the following description of the present invention.

SUMMARY

These and other objects are accomplished by the present invention which in one of its aspects is a process for the production of phenolic esters of aromatic carboxylic acids comprising heating in the liquid phase and to above 275°C. a mixture of a monoatomic phenol and an aromatic carboxylic acid which contains at least one carboxyl group directly attached to an aromatic ring, said aromatic carboxylic acid also being free of ketonic and aldehydic carbonyl groups, whereby said carboxyl group is esterified by said monoatomic phenol so as to form a phenolic ester, followed by recovery of the phenolic ester thus formed.

DESCRIPTION OF THE PREFERRED EMBODIMENTS

As may be seen the present invention is relatively simple as it merely involves heating a mixture of the phenol and the aromatic acid to an elevated temperature followed by recovery of the ester. No catalyst is required in the reaction although acidic catalysts such as phosphoric acid, phenyl phosphoric acid and boric acid may be used if desired. If a catalyst is utilized a phosphorus acid catalyst is preferred since most other strong acids present corrosion problems at the temperatures involved. If a catalyst is utilized it should be present in catalytic amounts which will usually be less than about 1.0 weight percent based on the weight of the carboxylic acid present. The present process produces water as a by-product instead of the hydrochloric acid by-product of prior art methods and thus does not present the corrosion problems of the prior art methods. The present process is also highly advantageous in that a high purity aromatic acid is not required as a starting material since the present process can also accomplish purification as well as esterification.

A great many aromatic carboxylic acids of varying nature may be esterified according to the present invention but they should be those free of aldehydic and ketonic carbonyl groups as these groups will interfere in the esterification reaction. At this point it is pointed out that by the term "aromatic carboxylic acid" as used herein is meant a carboxylic acid which contains a carboxyl group directly attached to an aromatic ring. It is not intended to imply that the present process can be used for the esterification of carboxyl groups which are not attached directly to aromatic rings. On the contrary it has been found that little or no esterification occurs when the present process is applied to non-aromatic acids such as heptanoic acid or those carboxylic acids such as phenyl acetic acid which do contain aromatic rings but wherein the carboxyl group is not directly attached to the aromatic ring. However the presence of those "non-aromatic" carboxyl groups does not interfere with the esterification of any carboxyl groups which are attached to an aromatic ring and thus the present process can be utilized to esterify an aromatic ring-attached carboxyl group of a compound which contains both a carboxyl group attached to an aromatic ring and a carboxyl group which is not attached to a ring. Homophthalic acid, also known as carboxy-alpha-toluic acid is an example of such a compound containing both types of carboxyl groups. Where the aromatic carboxylic acid to be esterified contains more than one carboxyl group attached to the aromatic ring, the reaction product will generally be an equilibrium mixture of the various esters that are possible. Thus when esterifying terephthalic acid with phenol, the reaction product will generally be comprised of an equilibrium mixture of diphenyl terephthalate and monophenyl terephthalate. However by varying the reaction conditions, the percentage of a particular desired mono- or poly- ester can be increased over that amount which is present in an equilibrium mixture. Once again using terephthalic acid as an example of a polycarboxylic acid, if it is desired to produce mainly monophenyl terephthalate the reaction conditions can be made milder such as by lowering the temperature and shortening the reaction time so that the monophenyl terephthalate is removed before most of it can further react to form the diphenyl terephthalate. Of course any diphenyl terephthalate in the product may be recycled to the reaction zone. If it is desired to produce diphenyl terephthalate to the exclusion of monophenyl terephthalate, one can accomplish this by the continuous removal of the by-product water from the reaction zone. As pointed out above, water is a by-product of the esterification reaction and it is the presence of this water which causes the mono and diesters to form an equilibrium mixture. Removal of the water will allow the diphenyl terephthalate concentration to proceed past the equilibrium amount and will allow production of a diester product containing very little monoester product. In such cases the amount of water which is removed can be used as a measure of the completeness of the reaction since a molecule of water is formed for each carboxyl group that is esterified.

It has already been pointed out that the aromatic carboxylic acids to be esterified should be free of aldehydic and ketonic carbonyl groups as these groups interfere with the esterification reaction. Other than these aldo and keto groups, the aromatic carboxylic acid may contain various functional groups which will not interfere with the esterification reaction. Generally better results are obtained however when aromatic carboxylic acid contains no functional groups or radicals other than carboxyl, carboxylic ester, ether, thioether, aromatic ring-substituted hydroxyl, aromatic ring-substituted halo, sulfo, or sulfonyl. The best results are obtained with aromatic carboxylic acids free of ketonic and aldehydic carbonyl groups and being of the formula

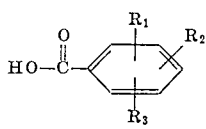

wherein $R_1$ and $R_2$ are alike or different and correspond to hydrogen, carboxyl or hydroxyl and wherein $R_3$ is hydrogen or an organic radical of six to 20 carbon atoms containing an aromatic ring, which organic radical is composed only of elements selected from the groups consisting of carbon, hydrogen, and oxygen.

Especially good results are obtained with those dicarboxylic acids of the formula

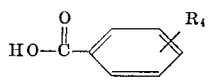

where $R_4$ is carboxyl group or a radical of seven to 20 carbon atoms of the formula

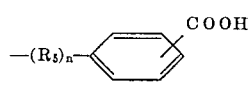

wherein $n$ is 0 or 1 and wherein $R_5$ is a divalent hydrocarbon radical, oxygen, or a divalent radical composed of carbon, hydrogen, and oxygen wherein the oxygen present is as an ether linkage. Among the acids containing aromatic ring-substituted carboxyl groups that may be esterified in accordance with the present invention are p-hydroxybenzoic acid, benzoic acid, terephthalic acid, isophthalic acid, diphenic acid, homophthalic acid, toluic acid, alpha-naphthoic acid, chlorobenzoic acid, salicylic acid, 1,2-(ethylenedioxy) dibenzoic acid, and 2,5-dimethyltere-phthalic acid.

The phenols utilized in the present invention must be mono functional phenols; that is they must contain only one phenolic hydroxyl group. Generally these phenols will be those of six to 15 carbon atoms of the formula

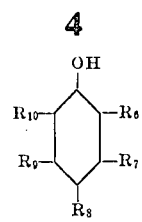

wherein $R_6$, $R_7$, $R_8$, $R_9$ and $R_{10}$ may be hydrogen, alkyl, alkaryl, aryl, or aralkyl radicals. Among the particular phenols that may be utilized are phenol, o-cresol, m-cresol, p-cresol, xylenols, either mixed or the pure isomer, o-phenyl phenol, and p-phenyl phenol. Of the various phenols that may be utilized, phenol itself is preferred over the others.

The production of an ester product will result practically regardless of the ratio of the aromatic carboxylic acid and phenol. Thus the ratio of phenol to carboxylic acid may range from 0.1 to 100 equivalents of phenol per equivalent of acid. Although it is preferred that there be at least a 10 percent excess of the phenol over that to be utilized in the reaction. The use of excessive amounts of the monofunctional phenol is advantageous in one respect that it allows high (up to 100 percent) conversions of the aromatic acid. This is advantageous because the aromatic acids are generally the more expensive reactant. The use of excessive amounts of the phenol is also advantageous because the phenol can then serve as a reaction solvent. Since many of the carboxylic acids, such as terephthalic acid, are quite insoluble and melt at high temperatures which may be in excess of that desired for the reaction temperature, the only way to get these carboxylic acids in a liquid form so that they may react with the phenol is to dissolve them in a solvent. Although an inert solvent such as a high boiling hydrocarbon can be used it is generally desirable to just use an excess of the monoatomic phenol to serve as a reaction solvent. The presence of a solvent, such as the phenol or an added inert solvent, is also advantageous when the reaction is terminated since cooling the reactor effluent to recover the ester product will often cause crystallization of solids. If an excess of phenol or other liquid solvent is not present upon such crystallizations, instead of having a slurry which is relatively easy to handle, one would have a solid mass that could easily plug equipment, etc. It has been found however that when cooling the reactor effluent so as to crystallize the ester product, it is far more advantageous to have a phenol present as the liquid instead of an inert solvent such as a hydrocarbon because crystallization of the ester from a monofunctional phenol provides extremely good purification. That is to say it has been found that most impurities introduced into the reaction system with the carboxylic acid starting material will remain in solution in the phenol upon cooling the reactor effluent so as to crystallize the ester product. This purification effect is highly advantageous from an economic standpoint as an inexpensive crude carboxylic acid starting material may be utilized instead of the more expensive high purity reactants required in prior art processes.

As to the reaction conditions, the temperature must be above 275°C, for example 275°–400°C, and will generally be within the range of about 300°–350°C. The pressure should be sufficient to maintain a liquid phase and will usually vary between about 300 to 3,000 psig. The reaction time will vary according to the particular reactant selected but usually will be at least 5 minutes.

Most often the reaction time should be from 30 to 240 minutes. The reaction may be conducted continuously or batchwise and may be conducted, as pointed out above, in the absence or presence of an inert solvent such as a high boiling hydrocarbon. Also as was pointed out above a solvent will generally not be necessary when an excess of the phenol is used since the phenol itself acts as a solvent. If the monofunctional phenol is not in excess, addition of a solvent will sometimes be helpful in recovering the ester product. If water is removed during the reaction it will usually be azeotroped with any added inert solvent and after removal of the azeotrope from the reaction zone the solvent may be separated from the water and returned to the reaction zone. Among the inert solvents that may be utilized are toluene, xylene, or higher alkyl-aromatic hydrocarbon and a naphtha cut, boiling in the 100°–200°C range.

After the esterification reaction is complete the recovery of the desired product can be accomplished by any of the well-known techniques and the particular method utilized to accomplish the recovery does not comprise a part of the present invention. For example fractional distillation, fractional crystallization, and solvent extraction may be used. Generally the phenyl esters of an aromatic carboxylic acid are more soluble in organic media than the acids themselves and thus fractional crystallization is usually a good method for separating any unreacted acid from the ester product. Likewise where a polycarboxylic acid is being esterified the various esters can usually be separated from each other by fractional crystallization since the monoester will generally be less soluble in organic media than the diester, the diester less soluble than the triester, etc. When separating a compound having a carboxyl group from an ester which does not, e.g. terephthalic acid from diphenyl terephthalate or monophenyl isophthalate from diphenyl isophthalate, one can usually render the carboxyl-containing compound more soluble in water than the fully esterified compound by forming the alkali metal salt of the carboxyl-containing compound. This can be accomplished for example by adding the mixture of compounds to an aqueous solution of NaOH whereby the carboxyl-containing compound is solubilized in the aqueous solution due to the formation of the sodium salt thereof. Addition of a strong acid to the aqueous solution will spring the compound from its sodium salt resulting in precipitation of the compound. Other methods will also be apparent to those skilled in the art.

The following examples are given in order to illustrate specific embodiments of the present invention.

EXAMPLE I

A three liter titanium rocking autoclave was charged with 250 grams of isophthalic acid and 1,416 grams of reagent grade phenol. The autoclave was then heated with rocking to about 330°C for 30 minutes after which the autoclave was quickly cooled to 70°C and the contents thereof filtered. The filter cake comprised mainly unreacted isophthalic acid while the filtrate consisted mainly of isophthalic acid esters in solution in phenol. The filtrate was distilled under vacuum to remove the unreacted phenol and water by-product leaving a residue which was a mixture of the mono- and di-esters. By running acid numbers and ester numbers the residue was determined to have contained 191 grams of monophenyl isophthalate and 63 grams of diphenyl isophthalate.

EXAMPLE II

In order to produce bis(p-phenylphenyl) isophthalate, 979 grams of p-phenyl phenol, 430 grams of isophthalic acid, 5 grams of 85 percent o-phosphoric acid and 250 milliliters of a xylene solvent were added to a 3 liter flask fitted with a stirrer, a thermowell and a 15 tray Oldershaw column modified with a Dean-Stark decanter. The mixture was slowly heated to about 315°C and a water-xylene azeotrope distilled over into the decanter, with the xylene being returned to the reactor. After about 3 hours water ceased to come over indicating that the esterification was essentially complete. The contents of the flask were then cooled to about room temperature causing crystallization of bis(p-phenylphenyl) isophthalate from solution along with a small amount of mono(p-phenylphenyl) isophthalate. This crystalline material was then mixed with an equal weight of water, placed in a Waring blender and agitated thoroughly. During the agitation sodium hydroxide was added slowly until the mixture was strongly alkaline causing solubilization of the monoester due to formation of the sodium salt. The insoluble diester was then recovered by filtration, washed thoroughly with water and dried. The yield was about 1,118 grams of bis(p-phenylphenyl) isophthalate. The ester number of this diester was determined to be 235 mg. KOH/gm. sample; calculated 238.

The monoester was then recovered from the alkaline mother liquor by first bubbling $CO_2$ through the mother liquor to precipitate the p-phenyl phenol present which was then removed by filtration. The filtrate was further treated with sulfuric acid to spring the monoester from its sodium salt and the solid monoester recovered by filtration and washed thoroughly with water. The yield was 57 grams of mono(p-phenylphenyl) isophthalate having an ester number of 174 mg. KOH/gm. sample; calculated value 176.

EXAMPLE III

In order to illustrate the use of a crude aromatic carboxylic acid, a crude terephthalic acid produced by the air oxidation of p-xylene and containing 2,900 ppm of 4-carboxybenzaldehyde, 1,600 ppm of toluic acid and 205 ppm of cobalt was esterified with phenol as follows. 250 grams of the crude terephthalic acid and 1,416 grams of reagent grade phenol were charged to a 3-liter rocking autoclave and then the autoclave heated with rocking to 325°C for 30 minutes. After the period of heating the autoclave was cooled to 90°C causing crystallization of unreacted terephthalic acid. The unreacted terephthalic acid was removed by filtration and the filtrate, which contained the phenolic esters, was evaporated to dryness so as to leave a residue. The residue comprising phenolic esters of terephthalic acid was blended with a caustic solution causing solubilization of the monoester. The diphenyl ester which remained in solid form was recovered by filtration, and washed thoroughly with water. The yield of diphenyl terephthalate was 57.2 grams of ester having as ester no. of 351 (mp. 196°–198°C); calculated 352. The alkaline filtrate was treated first with $CO_2$ to liberate any phenol present and, after this the alkaline filtrate was further treated with sulfuric acid so as to spring the monoester from its sodium salt causing it to precipitate as a solid. The thus precipitated monoester was washed with water and analyzed. The yield of monophenyl terephthalate was 165.3 grams having an ester number of 235 (mp. 236°–238°C); calculated 232. Both the diphenyl terephthalate and the monophenyl terephthalate contain less than 5 ppm of 4-carboxybenzaldehyde, less than 10 ppm of toluic acid, and less than 2 ppm of cobalt.

EXAMPLE IV

272 Grams of p-toluic acid and 1,416 grams of reagent grade phenol were charged to a 3 liter rocking autoclave. The autoclave was then heated with rocking to 325°C for 30 minutes. After the heating period the autoclave was rapidly cooled to 20°C and the entire contents of the autoclave were charged to a vacuum still. The water by-product and phenol were removed by vacuum distillation and then the remaining residue dissolved in hot toluene. The toluene solution was comingled with aqueous sodium carbonate whereby the unreacted p-toluic acid was extracted into the alkaline aqueous phase. The phenyl p-toluate remained with the toluene phase and was recovered by evaporating the toluene phase to dryness. The residue remaining comprised about 157 grams of phenyl p-toluate, the saponification number of which was 384; theoretical 379., mp. 71°C.

What is claimed is:

1. A process for the production of phenolic esters of aromatic carboxylic acids comprising heating in the absence of a catalyst in the liquid phase to a temperature above 275°C a mixture of a monoatomic phenol of from six to 15 carbon atoms of the formula:

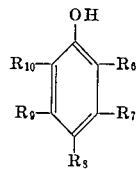

wherein $R_6$, $R_7$, $R_8$, $R_9$ and $R_{10}$ are hydrogen, alkyl alkaryl, aryl, or aralkyl radicals; and an aromatic dicarboxylic acid of the formula:

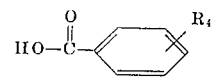

wherein $R_4$ is a carboxyl group or a radical of from seven to 20 carbon atoms of the formula:

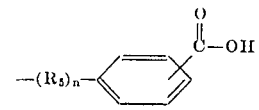

wherein $n$ is 0 or 1 and wherein $R_5$ is a divalent hydrocarbon radical, oxygen, or a divalent radical composed of carbon, hydrogen, and oxygen wherein the oxygen present is an ether linkage; and recovering the phenolic ester thus formed.

2. A process according to claim 1 wherein the temperature is from 275°C to 400°C.

3. The process of claim 1 wherein the amount of phenol that is utilized is such that there is at least a 10 percent excess over that to be utilized in the reaction.

4. The process of claim 1 wherein said monoatomic phenol is phenol and wherein said carboxylic acid is terephthalic acid, isophthalic acid or mixtures thereof, and wherein the diphenyl ester is produced and recovered.

5. The process of claim 1 wherein water is removed during the esterification.

6. The process for producing a diphenyl ester of a phthalic acid comprising heating in the absence of the catalyst and in the liquid phase to a temperature of 250° to 400°C and for a period of at least 5 minutes a mixture of said phthalic acid and phenol whereby a diphenyl ester of the phthalic acid is produced followed by recovery of the diphenyl ester.

7. The process of claim 6 wherein water is removed during said heating.

8. The process of claim 7 wherein the amount of phenol utilized is at least a 10 percent excess over that to be utilized in the reaction.

9. The process of claim 8 wherein said phthalic acid is terephthalic acid.

10. The process of claim 9 wherein said phthalic acid is isophthalic acid.

* * * * *